UNITED STATES PATENT OFFICE 2,112,167

METALLIC IRON FOR USE AS A PHARMACEUTICAL PREPARATION

Szebelledy Laszló, Budapest, Hungary

No Drawing. Application April 13, 1937, Serial No. 136,668. In Hungary March 16, 1936

1 Claim. (Cl. 167—72)

It is known that ionic iron can also be introduced into the human organism by dispensing finely divided metallic iron. For this purpose, the finely divided chemically pure preparation "Ferrum Reductum" (The Pharmacopoeia of the United States of America, Eleventh Decennial Revision, page 164) has so far been regarded as the most suitable; but even this extremely finely divided iron-powder dissolves only slowly in the stomach, and, therefore, only a small part of the quantity of iron dispensed can be absorbed. Consequently, to permit sufficient quantities of iron to dissolve and pass into the organism, the daily dose had to be rather high, i. e., about 8–10 grams. By dispensing such large quantities the iron granules irritate the mucous membrane of the stomach and intestines. In consideration of the curative effect it is important in special cases to introduce the ionic iron into the organism by dispensing metallic iron.

As the acid concentration of the gastric juice and the duration of stay in the stomach of the materials entering it remain constant, the above mentioned disadvantages can only be overcome by increasing the solubility of the iron.

It is known that the hydrogen-gas formed by dissolving iron in an acid only separates from the metallic iron at a rather high polarization potential whereby the dissolution, especially in the case of dilute solutions, is extremely slowed down. The various metals can be arranged in a series according to the potential at which the hydrogen separates from them. If the iron is brought into close contact with a metal from which the hydrogen separates at a lower polarization potential than is the case with iron, a galvanic cell is formed with the iron as anode. The cathode is formed by the metal closely in contact with the iron, from which the hydrogen separates more easily and with less energy loss, and in consequence the iron dissolves more readily.

The polarization potential necessary for the evolution of hydrogen is extremely low with the precious metals; it is lowest in the case of platinum. If, therefore, the finely divided iron-powder is brought into close contact with platinum the iron dissolves far more quickly and readily.

If iron-powder activated in such a manner is used as a medicine the dosage can be reduced considerably. This smaller quantity of iron is to a great extent dissolved and, therefore, does not irritate the stomach.

It was found by experiment that ten times the amount of iron-powder activated with platinum as of pure iron-powder under the same conditions was dissolved in a hydrochloric acid-pepsin-solution of a concentration corresponding to gastric juice.

The catalyst-metal is preferably reduced on the metallic iron in aqueous solution. For this purpose, a soluble salt of the catalyst, for instance, is dissolved in water and this solution brought together with iron-powder. The precipitation of the catalyst can be assisted by the addition of reducing agents. In this process care must be taken that the metallic iron does not oxidize.

The catalyst can be deposited on the iron in any other way, for instance by cathode-spraying, or the iron-compound and the catalyst can be reduced together.

The favourable solubility of the iron can already be obtained by a small quantity of the catalyst, for instance by 0.1%.

The finely divided iron-powder mixed with a catalyst must be stored in absence of air and moisture. It is appropriate to enclose the prepared iron-powder in organic materials having a reducing action such as, for example, chocolate and malt. In this manner it can be marketed in the form of tablets and bonbons. The iron-powder doses can be provided with an air and water-tight lacquer coating, for instance with marzipan lacquer.

*Example 1*

The quantity of its salt corresponding to 0.2 gram of catalyst-metal, for instance 0.53 gram $H_2(PtCl_6).6H_2O$, is dissolved in 1 liter of water saturated with carbonic acid. Carbon dioxide is passed through and the aqueous solution is treated with 200 grams of chemically pure iron-powder (reduced with hydrogen) and stirred for 2 hours. Then the iron-powder is separated from the liquid by pouring off, washed with water saturated with carbonic acid, and dried in a current of indifferent gas.

The iron-powder dried in this manner is suitably stored in an air and water-tight packing.

*Example 2*

75 parts by weight of crystalline ferrous-sulphate are dissolved in 600 parts of water with the addition of 8 parts by weight of concentrated sulphuric acid. The solution is treated with a solution of platinum-chloride corresponding to 0.0015 part by weight of Pt and precipitated by the gradual addition of a solution of caustic soda. The resulting precipitate is washed by repeated decanting in order to remove the salt and finally filtered. The precipitate is dried at 100° C. and the dust-dry mass pulverized. The product is now heated in a tube in a current of hydrogen until the reduction is complete. The reduced iron thus obtained possesses a grey lustre and when crushed forms a fine powder.

I claim:
A pharmaceutical preparation comprising reduced metallic iron in permanent contact with platinum.

SZEBELLEDY LASZLO.